May 8, 1934.  H. R. SCHEIDEGGER  1,958,208
ELECTRIC LONG DISTANCE INDICATING SYSTEM
Filed Jan. 18, 1929  3 Sheets-Sheet 1
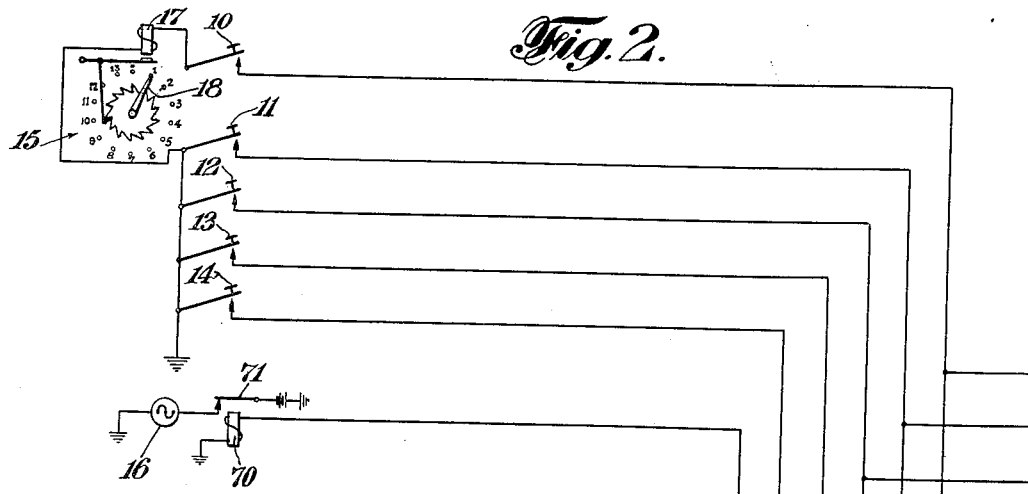
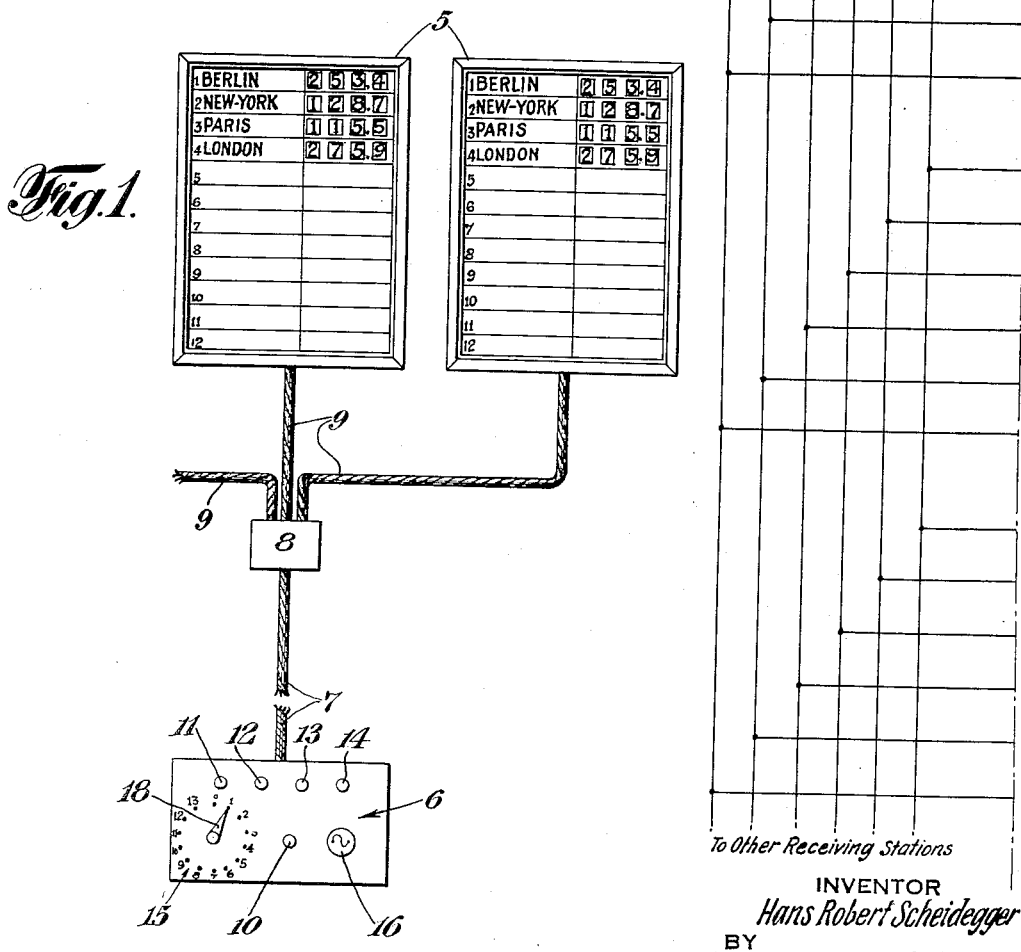
INVENTOR
Hans Robert Scheidegger
BY
ATTORNEYS May 8, 1934.  H. R. SCHEIDEGGER  1,958,208

ELECTRIC LONG DISTANCE INDICATING SYSTEM

Filed Jan. 18, 1929   3 Sheets-Sheet 2

INVENTOR
Hans Robert Scheidegger
BY
Ward Crosby Neal
ATTORNEYS

Patented May 8, 1934

1,958,208

UNITED STATES PATENT OFFICE 1,958,208

ELECTRIC LONG-DISTANCE INDICATING SYSTEM

Hans Robert Scheidegger, Wannsee-Berlin, Germany, assignor to The Teleregister Corporation, New York, N. Y., a corporation of Delaware Application January 18, 1929, Serial No. 333,477
In Germany March 22, 1928

13 Claims. (Cl. 177—353)

My invention relates to certain new and useful improvements in electrical indicating systems such as exchange indicating boards, stock quotation boards or the like.

The objects of my invention include the provision of apparatus of the above indicated class which will be adaptable with a wide degree of flexibility to various operating conditions and which will be accurate, rapid and dependable in operation.

Further and more specific objects, features and advantages will appear from the following description taken in connection with the accompanying drawings and claims which form a part of this specification.

In the drawings, Fig. 1 shows a keyboard and a plurality of exchange indicating boards;

Fig. 2 shows the keys and circuits in the transmitting station; and

Figure 3:
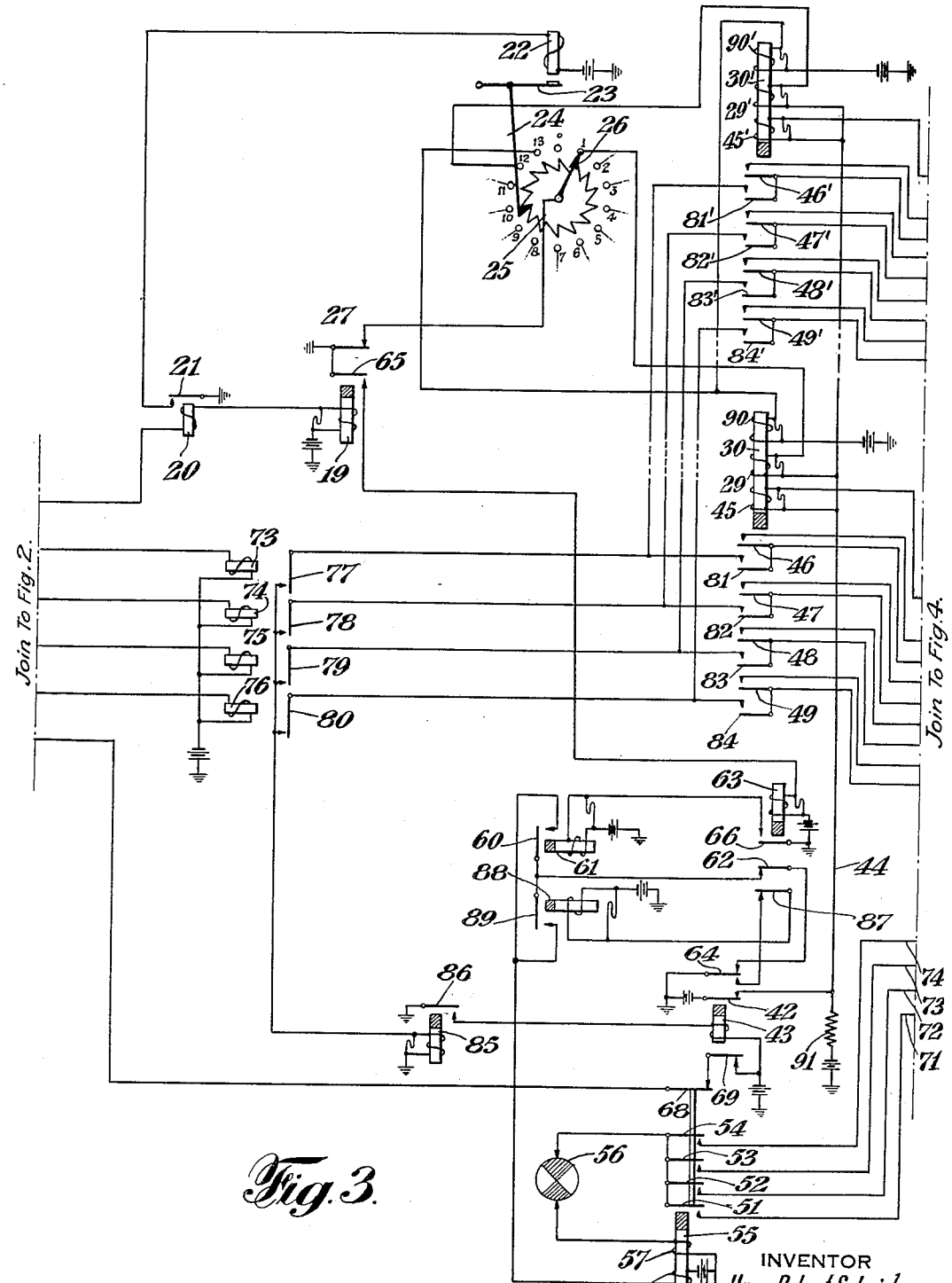
Figs. 3 and 4 show the controlling and operating circuits in a receiving station.

The invention is illustrated in connection with a system for posting a plurality of exchange values at distant stations. An exchange board 5, such as shown in Fig. 1, is located at each receiving station or office and may comprise a number of groups of indicator elements, the drawings showing provision for twelve groups of indicators and four indicators in each group for indicating twelve exchange rates by numbers comprising three digits and a fraction. It is to be understood that the number of groups of indicators and the number of indicator units in each group may be readily increased or decreased to suit the requirements, and that other items of information may be selectively posted such for example as the "open", "high", "low" and "last" prices of stocks or prices of other commodities.

The keyboard 6 disclosed in Fig. 1 is by way of example only, as it is obvious that well known types of keyboards or tape transmitters could readily be substituted. A cable 7 containing the electrical connections controlled by the keys extends to a connection box 8 in which various cables 9 leading to the indicator boards 5 are connected.

The keyboard, Figs. 1 and 2, comprises a selecting key 10, denomination digit keys 11, 12, 13 and 14, a selection indicating device 15, and a signal light 16, which is suitably grounded as shown. The keys 10 and 11, 12, 13 and 14 may be connected to a common line to ground and in this common line between the keys 10 and 11 an indicating device 15 may be connected. This device may comprise an ordinary stepping magnet 17 for actuating a pawl and ratchet wheel for rotating an indicating pointer 18 on a scale of numerals as indicated.

Figure 4:
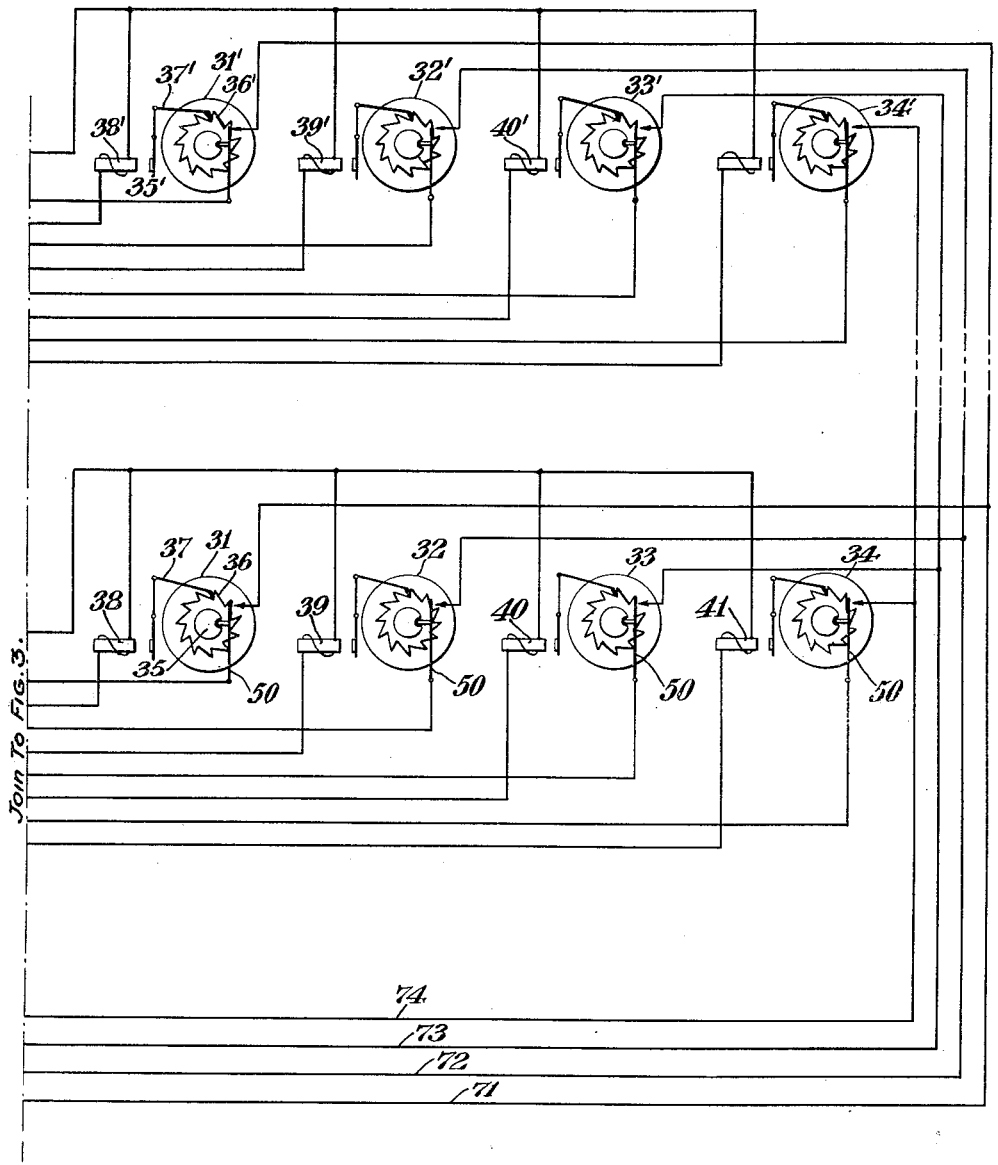

The selecting, controlling and operating mechanisms located at each of the stations are shown in Fig. 3 and comprise the devices common to all the groups of indicators at a station and certain selection control devices associated with individual groups at the station. Two of the groups of indicators are shown in Fig. 4. For purposes of facilitating tracing of the circuits, the circuits have been drawn to extend from figure to figure when the figures are joined as indicated.

Selection of the corresponding groups of indicators at the various receiving stations is made simultaneously, by pressing the selecting key 10 as many times as is required to move the pointer 18 to the numeral identifying the exchange item of which the rate or value is to be indicated.

Each depression of the key 10 closes the circuit at this point and extends it from ground to battery through the coil of a slow-to-release relay 19, Fig. 3, coil of relay 20, coil of stepping magnet 17 to ground, causing the pointer 18 to advance to the next number on the indicating scale.

The relay 20 connects ground through its make contact 21 and the coil of a stepping magnet 22 to battery and to ground. Each energization of the relay 20 causes the magnet 22 to attract its armature 23 which, through the pawl 24 cooperating with a ratchet wheel 25, advances a contact arm 26 one step, with the result that the position of the contact arms 26 in the various receiving stations may always be ascertained by observing the position of the pointer 18 of the selection indicating device 15 in the transmitting station.

The contact arm 26 is normally grounded by a break contact 27 of the slow-to-release relay 19. The selecting key 10 in its intended use is depressed successively in quick order to send out the selecting impulses. The first impulse causes the slow-to-release relay 19 to pick up, which will stay up until a short time after the last selecting impulse has been transmitted. Its break contact 27 will therefore remove the ground from the contact arm 26 before the contact arm receives its first stepping movement and will replace the ground at a short interval of time after the last selecting impulse has been transmitted.

The contact arm 26 may cooperate with any one of thirteen contacts, there being no active contact for the arm in the home position. Each of the contacts, one to twelve, is connected to one coil as at 29 of a slow-to-release indicator group selecting relay as at 30, 30', etc., to battery and ground, there being one relay such as at 30 for each exchange or stock item quoted. All of the relays as at 90 have one winding connected in parallel between contact thirteen (of switch 25) and battery and ground.

It follows that upon release of the relay 19, the relay 30 which is connected to the contact engaged by the arm 26 is energized, and that all the relays 30 and 30', etc., are energized when the arm 26 engages the thirteenth contact.

Each group of indicators may comprise for example, four indicator wheels 31, 32, 33 and 34, which may bear a blank space and the indicia 1 to 9 and 0, and have connected thereto a disk 35 notched to cause a contact member 50 to break a restoring circuit when the blank space reaches the indicating position. Each indicator also has connected thereto a ratchet disk as at 36 operated by a pawl 37 which is in turn actuated by an operating magnet as at 38, 39, 40 or 41.

As the break contact 27 is closed and grounds the relay 30 of the chosen quotation, this relay is energized by a circuit from ground to battery over the break contact 42 of a slow-to-release relay 43, line 44, coil 29 of the relay 30 (which has been selected by the contact arm 26), and break contact 27 to ground.

At the same time a circuit is prepared from line 44 over another coil 45 of the selected relay 30 over each of the operating magnets 38, 39, 40 and 41 of the indicator units 31, 32, 33 and 34, make contacts 46, 47, 48 and 49 of relay 30, over contact members 50 of the indicator wheels out of home position, to the make contacts 51, 52, 53 and 54 of a slow-to-release relay 55, which when energized will complete the circuit through an interrupter 56, and coil 57 of relay 55 to ground. This constitutes a holding circuit for relays 30 and 55.

The relay 55 will presently be energized by a circuit from ground to battery through another coil 58 of relay 55 over a make contact 60 of a slow-to-release relay 61, a break contact 62 of a slow-to-release relay 63, a make and break contact 64 of the unenergized slow-to-release relay 43 to ground.

At the time relay 19 was energized by the depression of the selecting key 10 and ground was removed from the contact arm 26, ground was applied by the make contact 65 of relay 19 to one terminal of the coil of the slow-to-release relay 63 connected at its other terminal to battery and ground. The relay 63 picked up, opened its break contact 62 and closed its make contact 66 completing a circuit from ground to battery through the coil of the slow-to-release relay 61, make contact 66 to ground. The relay 61 closed its contact 60 and thus prepared a circuit through winding 58 of relay 55, which circuit however was opened at break contact 62 of relay 63. After the selecting operation was completed relay 19 deenergized, causing relay 63 to deenergize which in turn caused relay 61 to deenergize shortly after relay 63 was deenergized. During the interval of time between deenergization of relays 63 and 61, the circuit over break contact 62 and make contact 60 completed the circuit over the coil 58 of relay 55, thus energizing this relay.

After the relay 55 is energized, the interrupter 56 closes the circuit over the other coil 57 of relay 55 over the make contacts 51, 52, 53 and 54 of relay 55 over contacts 50 of the indicators when out of home position, make switches 46, 47, 48 and 49 of energized relay 30, operating magnets 38, 39, 40 and 41, coil 45 of relay 30, and line 44 to battery to ground. This circuit constitutes a holding circuit for the relays 55 and 30. Impulses are then transmited by the interrupter 56 over each of the restoring lines 71, 72, 73 and 74 until these lines are respectively opened at their contact members 50.

The last restoring circuit to be opened by a contact member 50 will open the circuit through the coil 57 of relay 55 over the interrupter, and deenergize the relay 55 breaking all of the restoring circuits at the contacts 51, 52, 53 and 54.

As the relay 55 deenergizes, it closes its contact 68 which completes a circuit from ground to battery over break switch 69 of relay 43 over coil of relay 70, Fig. 2, to ground. Relay 70 completes a circuit from ground over its make switch 71 and through the lamp 16 on the keyboard to ground. This signal indicates that all of the selected indicators have been moved to their blank positions and that transmission of impulses by means of the numeral keys 11, 12, 13 and 14 may now begin. The slow-to-release relay 30 will remain energized for a short interval of time in case it should be desired to meanwhile move the contact arm 26 to another selecting position for selecting the next item to be quoted.

Each depression of a key 11, 12, 13 and 14, Fig. 2, completes a circuit from ground, contact of key, coil of its relay 73, 74, 75 and 76, Fig. 3, to battery and to ground. Energization of relays 73, 74, 75 and 76 closes the make contacts 77, 78, 79 and 80 which extend the circuits from the battery over the coil 45 of relay 30 and the coils of the operating magnets 38, 39, 40 and 41 over the make contacts 81, 82, 83 and 84 of relay 30, contacts 77 to 80, coil of relay 85 to ground. This steps the corresponding indicator wheel or wheels ahead one step and simultaneously the energization of relay 85 completes a circuit from ground to battery over coil of relay 43 and make contact 86 of relay 85 to ground. The relay 43 picks up and attracts its break contact 69 deenergizing the relay 70 which in turn releases and breaks the circuit for the lamp 16.

The relay 43 attracts its break contact 42 and breaks a short circuit for a resistance 91 connecting line 44 to ground through the resistance, thus preventing energization of any other selecting relay 30 during this transmitting operation.

Relay 43 also attracts its make and break contact 64 and breaks the circuit for relay 55 at this point and makes a circuit for the slow-to-release relay 88 from ground, battery, coil of relay 88, break contact 87 of relay 63, and make contact 64 to ground, energizing relay 88 which attracts its make contact 89 and prepares a circuit for relay 55 over its make contact 89, the break contact 62 of relay 63 and the make and break contact 64 to ground.

A short time after depression of keys 11, 12, 13 and 14 has ceased, the relay 85 will deenergize and interrupt the circuit of slow-to-release relay 43 which causes its break contact 69 to again signal to the operator, closes its break contact 42 to cut out the resistance 91 and permit energization of another selecting magnet 30, and closes its break contact 64 to complete the circuit through coil 58 of relay 55 during the short interval of time in which the slow-to-release relay 88 maintains this circuit closed at its make contact 89.

In a succession of operations in which no new adjustment of the selector is made prior to the completion of setting up an amount on the selected group of indicators, the initial energizing circuit for the restoration controlling relay 55 extends from ground, battery, coil 58, over make contact 60 of relay 61, break contact 62 of relay 63, and break contact 64 of relay 43 to ground.

In a succession of operations in which the contact arm 26 is adjusted to a new contact before the setting of the selected group has been effected and after relay 61 has become deenergized, breaking the circuit just described, the initial energizing circuit for the restoration controlling relay 55 will extend from ground, battery, coil 58 of relay 55, make contact 89 of energized relay 88, break contact 62 of deenergized relay 63, and make and break contact 64 of deenergized relay 43 to ground. This circuit is made after relay 43 is deenergized and before relay 88 is deenergized. The energization of relays 43 and 88 was caused by the depression of the numeral keys 11, 12, 13 and 14, and the circuit for the restoration controlling relay 55 just described was made after depression of numeral keys ceased, which caused the relays 85, 43 and 88 to descend slowly in succession.

In the case in which no new selection of indicators is made prior to the conclusion of the setting up of the selected indicators, the restoration controlling relay is initially energized shortly after the relay 19 has been deenergized.

If a selection of a new indicator is made prior to the conclusion of the setting-up operation of the selected indicators, the first initial energizing circuit for relay 55 is broken, and the second initial energizing circuit for relay 55 is prepared but is held open until the setting-up operation has been concluded, after which it is completed upon deenergization of relay 43 which simultaneously through its break contact 42 short-circuits the resistance 91, thereby permitting the energization of another selecting relay 30 grounded by the contact arm 26 in its new position of adjustment.

The twelfth relay such as at 30′ and the corresponding indicators are designated by the same reference characters as above used, accompanied by "prime" marks. As shown in Fig. 3, the line 44 extends to all of the relays 30 and 30′, connecting all of the selecting relays such as at 30 and 30′ in parallel, and the actuating lines controlled by the relays 73, 74, 75 and 76 controlled by the keys 11, 12, 13 and 14, extend to all of the contacts 81, 82, 83 and 84 of the relays 30 and 30′, connecting all of the actuating lines for the indicators in parallel. Similarly in Fig. 4, all of the restoring lines for the several groups of indicators are connected in parallel.

The thirteenth contact of the selector is connected to ground one terminal of third coils as at 90 of each of the relays 30 and 30′, etc., which have their other terminals connected to battery and ground. All of the relays 30, 30′, etc., may be energized by the moving contact arm 26 on to contact thirteen, resulting in causing an automatic restoration of all of the indicators of the several groups.

In systems in which it is found desirable, the relays 30 may be controlled for restoration and setting-up operations in smaller groups, as for example, for stock quotation boards a special contact such as 13 may be provided to simultaneously close the circuits through the coils 90 of relays 30 corresponding to "high" and "last" quotations, and another special contact may be provided to simultaneously close the circuits through the coils 90 of the "low" and "last" relays 30.

*Operation*

If it is desired to change any of the rates on the various boards, the operator will depress the selector key 10 a number of times, Figs. 1 and 2, until the pointer 18 moves to the numeral indicating the exchange rate to be changed. The contact arms 26 in the various boards will synchronously be moved to corresponding stationary contacts.

Assume that the pointer 18 and the contact arms are in the position shown and that the London rate of exchange is to be changed to 276.1. The operator will depress the key 10 three times to move the pointer 18 to the numeral 4 and all of the contact arms 26 will move on the contacts "4".

The first depression of key 10 caused each of the slow-to-release relays 19 for the various boards to pick up and attract its break contact 27 to remove the ground connection from the contact arm 26 to prevent energization of any of the selecting relays 30, while the contact arm 26 is being adjusted. The relay 19 also attracts its make contact 65 to energize the slow-to-release relay 63 which attracts its make contact 66 to cause energization of the slow to release relay 61. This latter relay attracts its make contact 60 and prepares an initial energizing circuit for the slow-to-release restoration controlling relay 55. This circuit is broken at the break contact of relay 63.

Shortly after the cessation of impulses under control of the selecting key 10, the relay 19 releases its break contact 27 thereby completing a circuit from ground over the break contact 42 of the slow-to-release relay 43, line 44, coil 29 of the selecting relay 30 connected to contact "4", contact arm 26, break contact 27 to ground.

Simultaneously the relay 19 releases its make contact 65 which opens the circuit of relay 63, which in turn opens the circuit for the slow-to-release relay 61. The break contact 62 of relay 63 when released completes a circuit over the coil 58 of relay 55, which will be opened by the make contact 60 upon deenergization of the relay 61. Energization of relay 55 closes its own holding circuit over its coil 57, interrupter 56, contacts 51, 52, 53 and 54, restoration lines 71, 72, 73 and 74, contact members 50, contacts 46, 47, 48 and 49 of the energized selecting relay 30, coils of indicator operating magnets 38, 39, 40 and 41, coil 45 of relay 30, line 44, break contact 42 of relay 43 to battery and ground. The line 44 is also connected to battery and ground through a resistance 91. This circuit also constitutes a holding circuit for the energized selecting relay 30.

Impulses sent over the restoration lines 71, 72, 73 and 74 by the interrupter respectively energize the indicator operating magnets 38, 39, 40 and 41 to move the indicators 31, 32, 33 and 34 to exhibit their blank spaces. The slow-to-release relays 55 and 30 remain energized as long as these impulses continue. As each indicator moves to exhibit its blank space, it breaks its corresponding restoring circuit 71, 72, 73 or 74 through movement of its contact member 50 into the position shown in Fig. 4.

After all of the circuits 71, 72, 73 and 74 have been broken, the holding circuits for relays 55 and 30 will be broken. The relay 30 will remain energized through the contact arm 26 and break switch 27 of relay 19.

As the relay 55 deenergizes, it closes its break contact 68 which closes the circuit through the coil of relay 70, which in turn attracts its make contact and closes the circuit for the lamp 16. This indicates that the selected indicators are in their blank positions ready to be actuated forwardly by depression of the numeral keys 11, 12, 13 and 14 in any order or simultaneously as desired.

Depression of any numeral key, for example key 11, energizes the relay 73, which attracts its make contact 77, which completes a circuit from ground to battery over break contact 42, line 44, coil 45 of relay 30, operating magnet 38, make contact 81 of relay 30, make contact 77 and coil of the slow-to-release relay 85 to ground. The indicator wheel 31 steps forward to the "1" position and the relay 85 attracts its make contact 86 to close a circuit through the coil of relay 43 which attracts its break contact 69 controlling the signal 16, and attracts its break contact 42 removing the short circuit for the resistance 91, which functions to prevent energization of any other relay 30' during setting-up operations. The key 11 is depressed twice to set up the number 2. The key 12 is depressed seven times, the key 13 six times and the key 14 once. A new rate, 276.1, is now set up for London on each of the boards. During the operation of any selected group of indicators the contact arm 26 may be adjusted to select another group of indicators if information as to another group of indicators is to be transmitted immediately thereafter, or, if no information is to be transmitted the contact arm 26 is moved to the blank position and the movement of this arm may be started during the price transmission operation or immediately thereafter, it being only necessary to break the circuit to the stock selecting relay prior to the energization of the relay 55 which takes place subsequently to the deenergization of the relay 43 which in turn takes place subsequently to the deenergization of the relay 85. It is, therefore, possible if desired to leave the contact arm 26 in its position of adjustment until the indicators have been set up so that the indicators may be immediately restored to zero in case an error in the depression of the keys is discovered. If information as to different stocks or other items is to be transmitted in rapid succession the adjustment of the contact arm 26 may be begun at any time after the restoration of the selected indicator has been started, if such adjustment is not completed before the restoration operation is completed, and in any event the adjustment of the contact arm 26 may be begun after the selected indicators have been restored to zero which is indicated by a flash of the signal 16.

After the new rate has been set up, the relay 43 deenergizes, short circuits the resistance 91 across its break contact 42 and closes a circuit from battery over its break contact 69 and the break contact 68 of relay 55 for the relay 70 which when energized closes a circuit across its contact 71 for the signal 16 which causes the signal 16 to flash.

If desired, the contact arm 26 may be adjusted over the fixed contacts in succession to clear all of the indicators. For example, the contact arm 26 might be moved over contact "1" and held there until restoration of the indicators for the Berlin rate has begun. The contact arm 26 may then be moved over contact "2" and held there until contact "2" is grounded at break contact 27 of relay 19, etc.

A special contact "13" is provided to ground all of the relays 30, 30' to cause simultaneous restoration or clearing of all of the indicators. The coils 90 of all of the relays 30, 30' are connected in parallel between the battery and ground through contact 13.

If desired, the contact arm 26 may be adjusted to a new position at the same time the keys 11, 12, 13 and 14 are operated to set selected indicators. If the ground for the contact arm 26 is applied before the setting-up operation of the indicators has been completed, the corresponding relay 30' will remain deenergized because of the resistance 91 which remains in the common selecting relay circuit as long as the depression of keys 11, 12, 13 and 14 continues.

Under this condition, the selection is held up but is made automatically upon deenergization of relay 43 which causes its break contact 64 to close a circuit from ground over the break contact 62 of deenergized relay 63, make contact 89 of the slow-to-release relay 88 which is still energized, over the coil 58 of the relay 55. Restoration of the newly selected indicators is automatically begun.

I claim:

1. In a receiving apparatus comprising a plurality of groups of electromagnetically operated indicators, restoration and setting-up circuits for said groups of indicators, means for selectively closing said circuits at one point for effecting selection of a group of indicators, means for simultaneously closing the restoration circuits at another point, and means controlled by said indicators as the last of the selected indicators becomes restored, for opening the restoration circuits at said other point.

2. In a receiving apparatus comprising a plurality of groups of electromagnetically operated indicators, restoration and setting-up circuits for said groups of indicators, means for selectively closing said circuits at one point for effecting selection of a group of indicators, means for automatically simultaneously closing the restoration circuits for all of the groups of indicators at another point, and means for automatically opening said restoration circuits at said other point after all of the selected indicators have been restored to home position.

3. In a receiving apparatus comprising a plurality of groups of indicators, a selection control device comprising a normally grounded contact arm, a plurality of cooperating fixed contacts, a selecting relay for each group of indicators having one terminal connected to battery and ground and the other terminal to one of said fixed contacts, and restoration lines for said indicators selectively prepared by said relays, an interrupter, and means for extending the restoration lines of all of the groups over said interrupter concurrently with connecting ground to said contact arm.

4. In a receiving apparatus comprising a plurality of groups of electromagnetically operated indicators, restoration and setting-up lines for said indicators, means for selectively closing the restoration and setting-up lines of the groups of indicators at one point, and means for automatically closing the restoration lines of all of the groups at another point and completing the restoration lines of the selected group, and means controlled by completion of the setting-up circuits for preventing closing of restoration and setting-up lines for other groups of indicators.

5. In a receiving apparatus comprising a plurality of groups of electromagnetically operated indicators, selection controlling means adapted to be set to automatically effect selection of a group of indicators after the setting has been completed, means for actuating the indicators to indicate items of information, said seclection controlling means being settable during the time the indicators are actuated, and means for preventing a selection by said selection controlling means prior to completion of the actuation of said selected indicators.

6. The combination of a receiving mechanism comprising a plurality of groups of indicators, a group selecting means, means for restoring the selected group to home position, a transmitting mechanism including a selection control and indicator actuating keys, circuits in the receiving station controlled by said keys for setting up amounts on the selected group, a signal adjacent the transmitting mechanism, and means in the receiving mechanism for operating said signal when all the indicators of a selected group have been returned to home position.

7. In a receiving apparatus comprising a plurality of groups of electromagnetically operated indicators, restoration and setting-up lines for said indicators, multi-contact relays for selectively closing the restoration and setting-up lines for selecting groups of indicators for operation, means for energizing any desired relay and automatically effecting restoration of the indicators associated therewith, said means being operable to energize other relays in succession, and means controlled by setting-up impulses to said indicator for preventing said means from energizing another relay during continuation of said impulses.

8. In a system of the character described comprising a transmitting mechanism and a receiving mechanism, said receiving mechanism comprising a plurality of groups of electromagnetically operated indicators, circuits in the receiving mechanisms for selectively restoring and actuating said groups of indicators, and means under control of the transmitting mechanism to selectively establish said circuits, a signal associated with the transmitting mechanism, and means in the receiving mechanism for operating said signal after the restoration of a selected group has been effected.

9. In a system of the character described comprising a transmitting mechanism and a receiving mechanism, said receiving mechanism comprising a plurality of groups of electromagnetically operated indicators, circuits in the receiving mechanisms for selectively restoring and actuating said groups of indicators, and means under control of the transmitting mechanism to selectively establish said circuits, a signal associated with the transmitting mechanism, means in the receiving mechanism for operating said signal after the restoration of a selected group has been effected, and means also in the receiving mechanism for operating said signal a short interval of time after the indicators have been set under control of said actuating circuits.

10. In a receiving apparatus adapted to be controlled from a distant point, the combination of a plurality of groups of rotatable indicators, impulse responsive electromagnetic means for each indicator for operating said indicator forwardly to normal, restoration lines over which impulses are transmitted to said electromagnetic means, a local impulse generator, means for selectively connecting the restoration lines of any group of indicators to said generator for simultaneously restoring all the indicators of a selected group, and means operated by each indicator as it moves into normal position for preventing surplus impulses from moving said indicator beyond normal position.

11. In a receiving apparatus comprising a plurality of groups of rotatable indicators, impulse operated electromagnetic means for restoring said indicators to normal position, means for rapidly and successively effecting selection of groups of indicators by preparing electrical paths to the respective electromagnetic means, an impulse generator, means operated as the first group of indicators is selected for extending said paths to said generator, and means controlling said last mentioned means to remain operated during an unbroken series of impulses operating to concurrently restore successively selected groups of indicators to normal.

12. An electrical indicating system comprising a plurality of sets of indicators, an impulse transmitting station, a selecting device acting in response to signal impulses from said station for completing an operating circuit from said station to chosen indicators, means for maintaining said circuit independently of said selecting device, whereby the selecting device may be restored to normal prior to or during the transmission of signals from said station to said chosen indicators, and means for interrupting said circuit after the completion of the transmission of operating signals to said indicators.

13. In a receiving apparatus adapted to be controlled from a distant point, the combination of a plurality of groups of rotatable indicators, impulse responsive electromagnetic means for each indicator for rotating said indicator to normal, circuits over which impulses are transmitted to said electromagnetic means, a local impulse generator for transmitting impulses over said circuits, means for selectively conditioning the circuits of any of said groups to receive impulses from said generator for rotating said indicators to normal, means operated by each indicator as it moves into normal position for preventing surplus impulses from moving said indicator beyond normal position and means for thereafter resetting the restored indicators.

HANS ROBERT SCHEIDEGGER.